United States Patent
Takahashi

[11] 3,738,738
[45] June 12, 1973

[54] SUPER-WIDE ANGLE PHOTOGRAPHIC OBJECTIVE
[75] Inventor: Yasuo Takahashi, Tokyo, Japan
[73] Assignee: Ashai Kogaku Kogyo Kabushiki Kaisha, Tokyo-to, Japan
[22] Filed: Sept. 2, 1971
[21] Appl. No.: 177,343

[30] Foreign Application Priority Data
Sept. 9, 1970 Japan.............................. 45/79064

[52] U.S. Cl. ................................ 350/214, 350/176
[51] Int. Cl. ...................................... G02b 9/64
[58] Field of Search ..................................... 350/214

[56] References Cited
UNITED STATES PATENTS
3,410,632  11/1968  Woltche............................. 350/214
3,512,874  5/1970   Woltche............................. 350/214
3,549,241  12/1970  Mori................................. 350/214 X Primary Examiner—John K. Corbin
Attorney—D. Bruce Prout

[57] ABSTRACT
A ten group, twelve element, super-wide angle photographic objective lens which corrects chromatic aberration over the whole image plane to be used and to obtain an aberration condition balanced therewith.

3 Claims, 6 Drawing Figures

SUPER-WIDE ANGLE PHOTOGRAPHIC OBJECTIVE

BACKGROUND OF THE INVENTION

This invention relates to wide angle photographic objective lenses. One of the drawbacks of present wide angle lenses is that with increased image angle, an overall reduction of chromatic aberration is very difficult. The wider angle the lens, the greater the aberrations. This is especially true of chromatic aberrations because the index of refraction is non-linear for different colors.

SUMMARY OF THE INVENTION

The present invention relates to an optical system which corrects chromatic aberration over the whole image plane to be used and to obtain an aberration condition balanced therewith.

DESCRIPTION OF THE PREFERRED EMBODIMENTS

Figure 1:
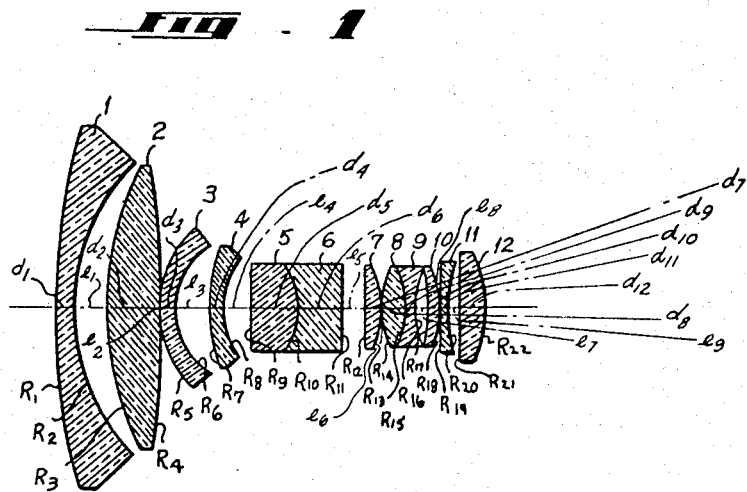
FIG. 1 is a sectional, elevational view of the lens system of one embodiment of the present invention identified hereafter as example 1.

The structure of the optical system is described with reference to the three embodiments shown in FIGS. 1, 3 and 5. The discussion applies to all of FIGS. 1, 3 and 5 except where stated otherwise.

The lens 1 is of negative meniscus type with the surface of larger curvature directed to the image side; the lens 2 is of positive type; and the lens 3 and the lens 4 are of negative meniscus type with the respective surfaces of larger curvature directed to the image side. The lens 5 and the lens 6 are cemented together. The resulting cemented lens may be of positive-negative combination as shown in FIG. 1 or of negative-positive combination as shown in FIGS. 3 and 5. Also, the resulting cemented lens as a whole is characterized in that it is of low power. The lens 7 and the lens 8 are of positive type. The lens 8 is cemented to the lens 9. The lens 9 is of negative type. The lens 10 is of positive meniscus type with the surface of larger curvature directed to the image side. The lens 11 is of negative meniscus type with the surface of larger curvature directed to the image side. The lens 12 is of bi-convex positive type.

Thus, the optical system consists of a 10 group, 12 element lens.

In accordance with the present invention, the optical system is characterized by the following conditions:

$F/1.3 < |F_4| < F/0.7$ and $F_{1.2.3.4} < 0$;  (1)
$0.7F < (l_4 + d_5 + d_6 + l_6) < 1.1F$;  (2)
$20 < |\nu_5 - \nu_6| < 35$;  (3)
$0.8 < |f_5| \div |f_6| < 1.2$;  (4)
$F/1.2 < |F_{1.2...5.6}| < F/0.6$ and $|F_{5.6}| > F/0.3$ and $F_{1.2.3...6} < 0$;  (5)
$0.15 < (n_9 - n_8) < 0.4$; and  (6)
$0.55F < |r_{15}| < 0.85F$ and $r_{15} < 0$;  (7)
$0.7F < r_{20} < 1.4F$  (8)
$\nu_1, \nu_2, \nu_3, \nu_4, \nu_5 > 55$  (9)

Except when the lens 5 is of positive type, then with respect to the lens 6 $\nu_6 > 55$.

The definition of terms in the above conditions are as follows:

| | — means absolute value;
$F$ — is the resultant focal length of the whole optical system;
$F_{1.2...i}$ is the resultant focal length of the first to the $i$-th lenses;
$l_j$ — is the spacing between the $j$-th lens and the next subsequent lens;
$d_k$ — is the thickness of the $k$-th lens;
$r_l$ — is the radius of curvature of the $l$-th lens surface;
$n_m$ — is the $d$-line index of refraction of the $m$-th lens;
$\nu_m$ — is the Abbe's number of the $m$-th lens;
$f_n$ — is the focal length of the $n$-th lens; and
$f_B$ — is the back focal length which is the length from the pole of the last lens 12 to the image forming surface.

Condition (1) is the lens power relation for obtaining $f_B$ which is larger than 1.7F. This is a natural form for a type of wide angle objective optical system wherein negative lenses are introduced in the front groups for having larger $f_B$. If $|F_{1.2.3.4}|$ is smaller than F/1.3, then a much greater correction is required by the negative working surfaces $R_2$, $R_4$ and $R_6$ and correction of coma aberration becomes difficult. Even if, as a solution to this problem, glass of greater value of index of refraction is utilized for $n_1$, $n_3$ and $n_4$ so that such surfaces can be of smaller curvature, since there exist only glasses of comparatively small $\nu$ value (for example, if the index of refraction is greater than 1.7, then there exist only glass having $\nu$ which is smaller than 55) chromatic difference of magnification cannot be entirely corrected over wide-angle range so that considerable aberration remains. On the other hand, if $|F_{1.2.3.4}|$ is greater than F/0.7, then it is difficult to have a longer $f_B$ and the intended object cannot be attained.

The condition (2) is necessary for obtaining the intended length of $f_B$ under the condition (1). If $(l_4 + d_5 + d_6 + l_5)$ is greater than 1.1F, then the $f_B$ condition is favorable but a disadvantage is produced in that it becomes necessary to make the first lens and the front lens group larger or to make the rear lens group larger so that the peripheral light amount is increased, making correction of aberration difficult.

The condition (3) is one of the main features of the present invention. Under condition (1), generally, chromatic aberration is overcorrected unless $\nu_2$ is of small value and the second lens is of very great power. With the light rays having passed through the fifth and sixth lenses, and with the negative power as indicated by condition (5), and considering the undercorrected whole system, it appears that excellent correction of chromatic aberration over wide-angle range is difficult. According to the present invention, however, an excellent result is obtained by means of comparatively large undercorrection in the front lens group in cooperation with the action of the rear lens group.

Under the condition (4), it is desirable for attaining the object that the $\nu$ difference is large. If, however, this is too much larger than 35, there is produced too much undercorrection and, accordingly, too much uncorrected remaining aberration to be corrected by the rear group lens system. On the other hand, if the $\nu$ difference is less than 20, it is difficult to obtain the undercorrection for attaining the object.

The condition (5) indicates that under condition (1), the cemented lens consisting of the fifth lens and the sixth lens cemented together has almost no power. Condition (4) is of course characterized in that it is valid within the range of condition (5). When the lens system remarkably deviates from condition (4), then it also deviates condition (5). Accordingly, irrespective of plus or minus signs, with respect to $|f_5|$ and $|f_6|$, the range of the condition (4) is appropriate, as is shown also in the examples. Condition (5) is originally intended for miniaturizing the objective and is characterized in that the resultant power of the fifth lens and the sixth lens is small. It is considered that the power of such degree as $|F_{5,6}| > F/0.3$ will not disturb various aberration conditions. For miniaturization the thickness of the fifth lens and of the sixth lens naturally come into question. It is considered that an $|F_{5,6}|$ which is smaller than F/0.3 would be to some extent unsuited for the object of the present invention.

Condition (6) is closely related to condition (7) and suitably determines the amount which depends on correction of spherical aberration and coma at the 15th surface. When $n_9 - n_8$ is larger than 0.4, correction of spherical aberration is apt to be excessive, and with respect to coma, in respect of light rays of low incident ray height, correction is excessive in the direction in which the image height increases. When $n_9 - n_8$ is smaller than 0.15, through the whole system, the effect of the 15th surface, which has large negative spherical aberration, is apt to be lost. Even if correction is to be by means of another surface, it is difficult to do so with a single surface within the range in which the aberrations are not unfavorably influenced. Also, with respect to coma, the aberration is produced in the inverse direction to the aberration that is produced when $n_9 - n_8$ is larger than 0.4.

Condition (7) is intended for compensation of the above-mentioned situation by means of another condition. If $|r_{15}|$ is smaller than 0.55F, the effect is excessive, resulting in an aberration which would be produced when $n_9 - n_8$ is larger than 0.4.

Condition (8) is intended for correcting coma with respect to rays of low incident ray height of the bundle of light rays having comparatively large incident angle. If $r_{20}$ is smaller than 0.7F, the result will be too much aberration in the direction of higher image height. If $r_{20}$ is larger than 1.4F, the aberration is apt to be produced in the reverse direction. Compensation of this by means of another member is not desirable since it will influence also light rays having comparatively small incident angles.

Condition (9) is originally intended for correcting chromatic aberration, that is, for producing effective achromatism by means of the sixth lens and following lenses. If the $\nu$ value of a negative lens indicated in this condition is smaller than 55, then the $\nu$ value of the second lens (a positive lens) must be small. This increases the chromatic difference of magnification with respect to light rays of large angles. Even if the chromatic difference of magnification is corrected with respect to large angles, it will be remarkably present with respect to small angles, leading to an undesirable result as a whole. Accordingly, in order to make better correction of chromatic difference of magnification with the positive lens of large $\nu$ value, it is desirable that the negative lens not produce longitudinal chromatic aberration due to overcorrection. The conventional method is to use negative lenses of large $\nu$ value. The remarkable feature of the present invention is, however, to excellently correct the chromatic difference of magnification by such an arrangement that each lens of the plurality of lenses constituting the front lens group has a large $\nu$ value and the intermediate group of lenses is placed in an undercorrected state.

Figure 2:
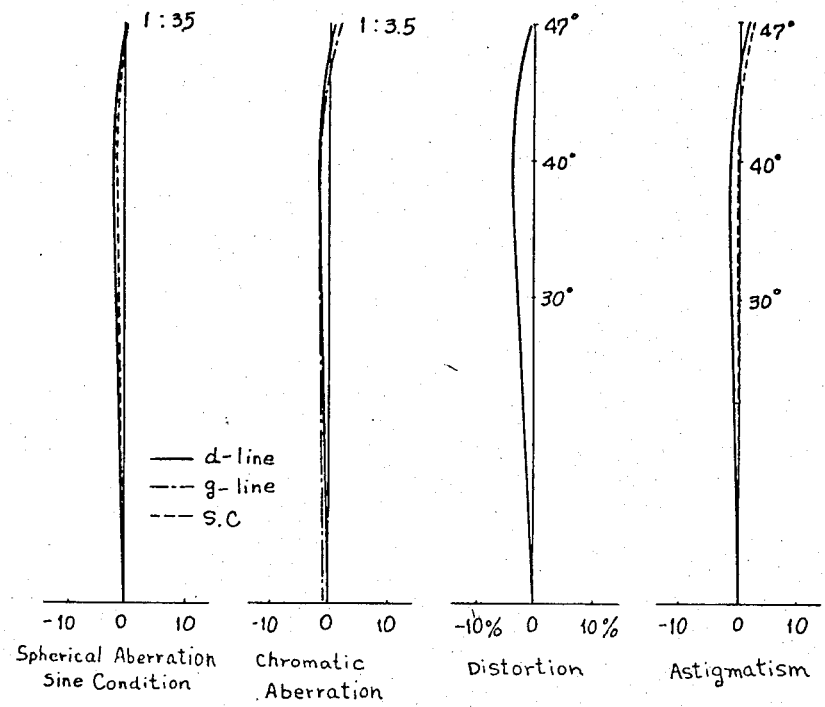
FIG. 2 is a diagram showing the aberration curves of example 1.
Figure 3:
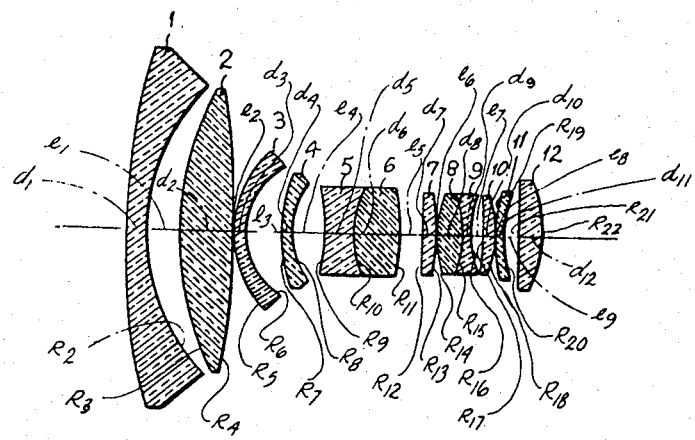
FIG. 3 is a sectional, elevational view of the lens system of a second embodiment of the present invention identified hereinafter as example 2.
Figure 4:
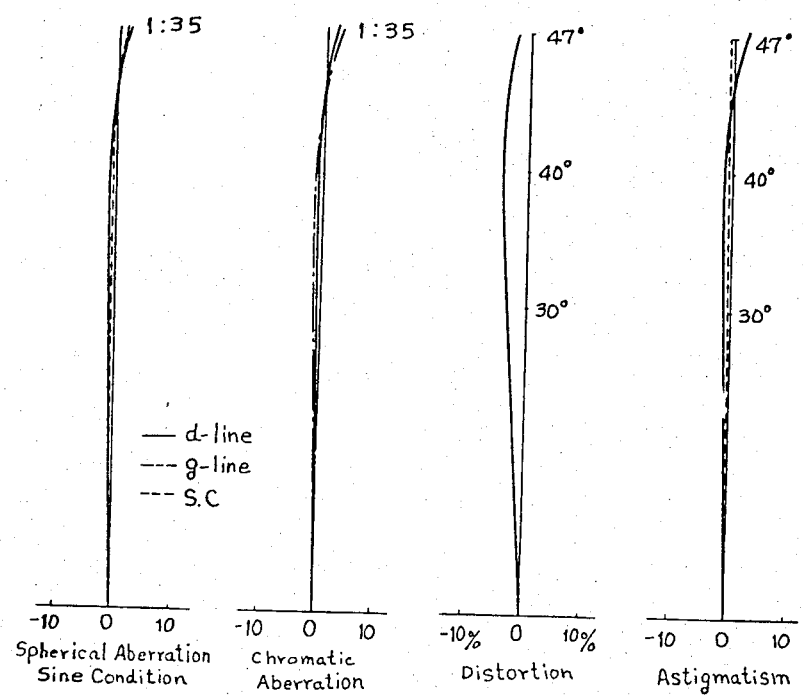
FIG. 4 is a diagram showing the aberration curves of example 2.
Figure 5:
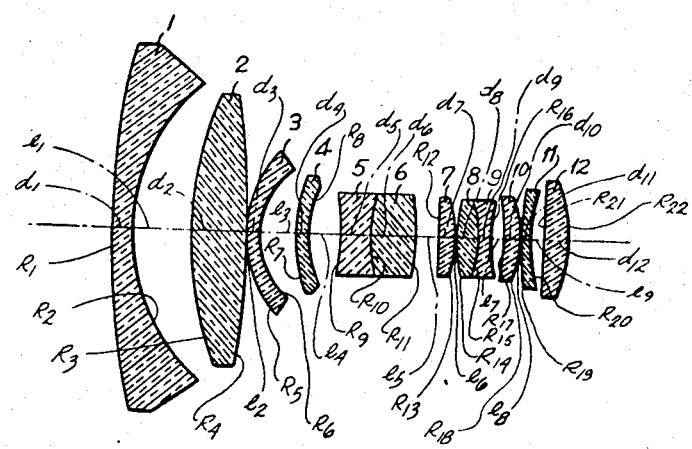
FIG. 5 is a sectional, elevational view of the lens system of a third embodiment of the present invention identified hereinafter as example 3.
Figure 6:
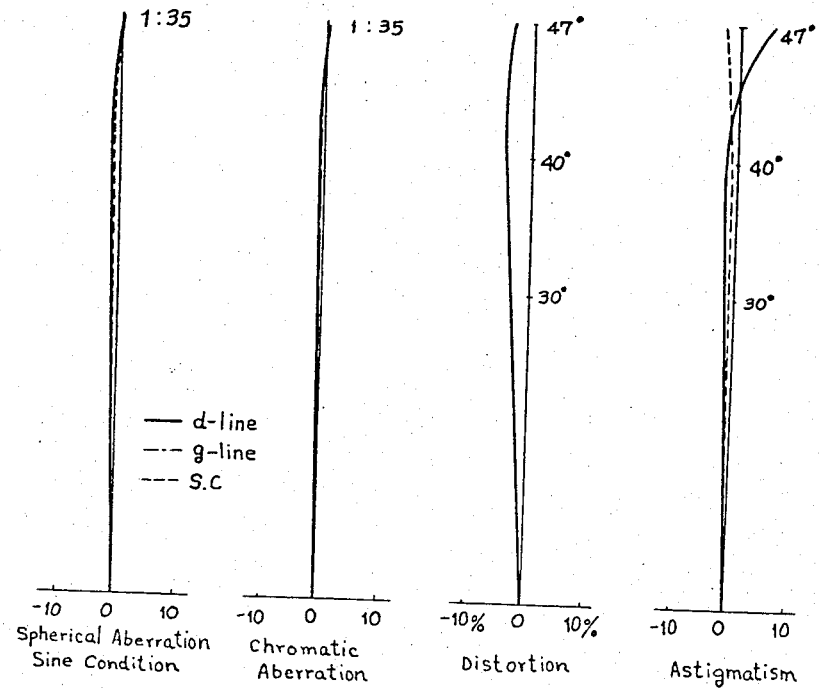
FIG. 6 is a diagram showing the aberration curves of example 3.

The low aberration obtained for the wide angle lens system of FIGS. 1, 3 and 5 is a marked improvement over previous wide angle lens systems as demonstrated by the aberration curves of FIGS. 2, 4 and 6.

The data in the examples shown in the drawings are as follows:

TABLE I

| | $(F_{1,2,3,4})$ | $(F_{1,2...6})$ | $(F_{5,6})$ | $(f_5)$ | $(f_6)$ |
|---|---|---|---|---|---|
| Example 1 | −0.919F | −1.F | 44.98F | 0.98F | −1.05F |
| Example 2 | −0.918F | −1.19F | 10.11F | −0.97F | 0.97F |
| Example 3 | −0.9186F | −1.25F | 8.15F | −1.04F | 1.00F |

TABLE II

EXAMPLE 1

F = 100mm

| Lens Surface | mm | Length in mm | Lens Number | d-line index of refraction | Abbe's Number |
|---|---|---|---|---|---|
| R1 | 519.231 | d1 11.06 | 1 | 1.64000 | 60.2 |
| R2 | 138.498 | l1 22.12 | | | |
| R3 | 209.135 | d2 37.50 | 2 | 1.51633 | 64.1 |
| R4 | −757.390 | l4 0.72 | | | |
| R5 | 78.365 | d3 8.99 | 3 | 1.64000 | 60.2 |
| R6 | 49.066 | l3 24.04 | | | |
| R7 | 117.788 | d4 8.99 | 4 | 1.64000 | 60.2 |
| R8 | 58.350 | l4 20.67 | | | |
| R9 | −384.615 | d5 31.25 | 5 | 1.63636 | 35.4 |
| R10 | −55.288 | d6 31.25 | 6 | 1.58913 | 61.2 |
| R11 | −619.439 | l5 14.42 | | | |
| R12 | 649.038 | d7 10.58 | 7 | 1.58913 | 61.2 |
| R13 | −106.296 | l6 0.48 | | | |
| R14 | 83.111 | d8 16.83 | 8 | 1.58913 | 61.2 |
| R15 | −73.077 | d9 7.69 | 9 | 1.81554 | 44.4 |
| R16 | 128.104 | l7 7.69 | | | |
| R17 | −192.308 | d7 7.21 | 10 | 1.51823 | 59.0 |
| R18 | −78.832 | l8 0.48 | | | |
| R19 | 403.846 | d11 6.73 | 11 | 1.76182 | 26.5 |
| R20 | 108.806 | l9 8.17 | | | |
| R21 | 743.971 | d12 16.83 | 12 | 1.51190 | 58.2 |
| R22 | −89.216 | | | | |

TABLE III

Table of Seidel's Coefficients of Example 1

| Lens Surface | S1 | S2 | S3 | P | S5 |
|---|---|---|---|---|---|
| R1 | 0.002 | 0.007 | 0.029 | 0.075 | 0.424 |
| R2 | −0.417 | 0.029 | −0.002 | −0.282 | 0.020 |
| R3 | 0.231 | 0.067 | 0.020 | 0.163 | 0.053 |
| R4 | 0.001 | −0.005 | 0.037 | 0.045 | −0.570 |
| R5 | 0.677 | 0.046 | 0.003 | 0.498 | 0.034 |
| R6 | −5.429 | 0.951 | −0.167 | −0.795 | 0.169 |
| R7 | 1.235 | 0.320 | 0.083 | 0.331 | 0.107 |
| R8 | −12.037 | 0.202 | −0.003 | −0.669 | 0.011 |
| R9 | 0.438 | 0.363 | 0.300 | −0.101 | 0.165 |
| R10 | 0.483 | −0.128 | 0.034 | 0.033 | −0.018 |
| R11 | −0.486 | −0.366 | −0.275 | 0.060 | −0.162 |
| R12 | 2.292 | 0.927 | 0.375 | 0.057 | 0.175 |
| R13 | 6.503 | −1.191 | 0.218 | 0.349 | −0.104 |
| R14 | 3.603 | 0.957 | 0.254 | 0.446 | 0.186 |
| R15 | −21.010 | 0.589 | −0.017 | 0.107 | 0.003 |
| R16 | −1.100 | −0.529 | −0.255 | −0.351 | −0.291 |
| R17 | −0.395 | 0.185 | −0.087 | −0.177 | 0.124 |
| R18 | 16.147 | −1.023 | 0.065 | 0.433 | −0.032 |
| R19 | −0.064 | 0.111 | −0.191 | 0.107 | 0.145 |

| | | | | |
|---|---|---|---|---|
| R20 | −2.864 | −1.271 | −0.564 | −0.397 | −0.427 |
| R21 | 0.039 | 0.061 | 0.096 | 0.046 | 0.223 |
| R22 | 16.469 | 0.068 | 0.000 | 0.380 | 0.002 |
| SUM | 4.317 | 0.371 | −0.047 | 0.142 | 0.239 |

TABLE IV

EXAMPLE 2

$F = 100$ mm

| Lens Surface | mm | Length in mm | Lens Number | d-line index of refraction | Abbe's Number |
|---|---|---|---|---|---|
| R1 | 518.657 | d1 11.04 | 1 | 1.64000 | 60.2 |
| R2 | 138.308 | l1 22.09 | | | |
| R3 | 211.305 | d2 37.46 | 2 | 1.51633 | 64.1 |
| R4 | −726.730 | l2 0.72 | | | |
| R5 | 76.838 | d3 8.98 | 3 | 1.64000 | 60.2 |
| R6 | 48.384 | l3 24.01 | | | |
| R7 | 121.471 | d4 8.98 | 4 | 1.64000 | 60.2 |
| R8 | 59.271 | l4 20.65 | | | |
| R9 | −168.083 | d5 21.61 | 5 | 1.51633 | 64.1 |
| R10 | 74.331 | d6 31.21 | 6 | 1.60342 | 38.0 |
| R11 | −229.587 | l5 14.41 | | | |
| R12 | 696.345 | d7 10.56 | 7 | 1.58913 | 61.2 |
| R13 | −119.358 | l6 0.48 | | | |
| R14 | 83.019 | d8 16.81 | 8 | 1.58913 | 61.2 |
| R15 | −67.978 | d9 7.68 | 9 | 1.81554 | 44.4 |
| R16 | 132.229 | l7 7.68 | | | |
| R17 | −192.095 | d10 7.20 | 10 | 1.51823 | 59.0 |
| R18 | −77.808 | l8 0.48 | | | |
| R19 | 384.190 | d11 6.72 | 11 | 1.76182 | 26.5 |
| R20 | 105.595 | l9 8.16 | | | |
| R21 | 743.149 | d12 16.81 | 12 | 1.51633 | 64.1 |
| R22 | −88.028 | | | | |

TABLE V

Table of Seidel's Coefficients of Example 2

| Lens Surface | S1 | S2 | S3 | P | S5 |
|---|---|---|---|---|---|
| R1 | 0.002 | 0.007 | 0.029 | 0.075 | 0.428 |
| R2 | −0.419 | 0.021 | −0.001 | −0.282 | 0.014 |
| R3 | 0.228 | 0.072 | 0.023 | 0.161 | 0.058 |
| R4 | 0.001 | −0.006 | 0.038 | 0.047 | −0.570 |
| R5 | 0.721 | 0.054 | 0.004 | 0.508 | 0.038 |
| R6 | −5.608 | 0.895 | −0.143 | −0.807 | 0.152 |
| R7 | 1.171 | 0.341 | 0.099 | 0.321 | 0.123 |
| R8 | −11.769 | −0.062 | −0.000 | −0.658 | −0.003 |
| R9 | 0.046 | 0.113 | 0.282 | −0.203 | 0.197 |
| R10 | 4.981 | 0.233 | 0.011 | 0.048 | 0.003 |
| R11 | −0.001 | −0.013 | −0.177 | 0.164 | −0.174 |
| R12 | 1.411 | 0.671 | 0.319 | 0.053 | 0.177 |
| R13 | 4.601 | −0.985 | 0.211 | 0.311 | −0.112 |
| R14 | 3.278 | 0.907 | 0.251 | 0.447 | 0.193 |
| R15 | −22.353 | 0.554 | −0.014 | −0.115 | 0.003 |
| R16 | −0.917 | −0.472 | −0.243 | −0.340 | −0.300 |
| R17 | −0.367 | 0.179 | −0.087 | −0.178 | 0.129 |
| R18 | 15.618 | −0.993 | 0.063 | 0.439 | −0.032 |
| R19 | −0.057 | 0.106 | −0.195 | 0.113 | 0.151 |
| R20 | −2.875 | −1.301 | −0.589 | −0.410 | −0.452 |
| R21 | 0.037 | 0.060 | 0.098 | 0.046 | 0.234 |
| R22 | 15.993 | 0.105 | 0.001 | 0.387 | 0.003 |
| SUM | 3.720 | 0.487 | −0.019 | 0.127 | 0.260 |

TABLE VI

EXAMPLE 3

$F = 100$ mm

| Lens Surface | mm | Length in mm | Lens Number | d-line index of refraction | Abbe's Number |
|---|---|---|---|---|---|
| R1 | 519.231 | d1 13.85 | 1 | 1.64000 | 60.2 |
| R2 | 130.205 | l1 40.86 | | | |
| R3 | 250.000 | d2 38.46 | 2 | 1.51633 | 64.1 |
| R4 | −569.697 | l2 0.24 | | | |
| R5 | 81.731 | d3 8.99 | 3 | 1.64000 | 60.2 |
| R6 | 51.734 | l3 24.04 | | | |
| R7 | 121.154 | d4 8.99 | 4 | 1.64000 | 60.2 |
| R8 | 60.657 | l4 23.08 | | | |
| R9 | −173.077 | d5 19.23 | 5 | 1.51633 | 64.1 |
| R10 | 80.288 | d6 33.65 | 6 | 1.62588 | 35.6 |
| R11 | −239.723 | l5 13.46 | | | |
| R12 | 3605.769 | d7 11.06 | 7 | 1.58913 | 61.2 |
| R13 | −113.405 | l6 0.24 | | | |
| R14 | 83.173 | d8 16.83 | 8 | 1.58913 | 61.2 |
| R15 | −69.711 | d9 8.65 | 9 | 1.81554 | 44.4 |
| R16 | 131.757 | l7 8.65 | | | |
| R17 | −199.519 | d10 9.61 | 10 | 1.51633 | 64.1 |
| R18 | −77.619 | l8 0.48 | | | |
| R19 | 353.365 | d11 6.73 | 11 | 1.80518 | 25.5 |
| R20 | 109.566 | l9 9.61 | | | |
| R21 | 649.038 | d12 19.23 | 12 | 1.51633 | 64.1 |
| R22 | −97.328 | | | | |

TABLE VII

Table of Seidel's Coefficients of Example 3

| Lens Surface | S1 | S2 | S3 | P | S5 |
|---|---|---|---|---|---|
| R1 | 0.002 | 0.007 | 0.027 | 0.075 | 0.412 |
| R2 | −0.416 | 0.054 | −0.007 | −0.282 | 0.038 |
| R3 | 0.202 | 0.082 | 0.033 | 0.136 | 0.069 |
| R4 | 0.002 | −0.011 | 0.051 | 0.060 | −0.530 |
| R5 | 0.763 | 0.068 | 0.006 | 0.477 | 0.043 |
| R6 | −5.897 | 0.795 | −0.107 | −0.754 | 0.116 |
| R7 | 1.366 | 0.354 | 0.092 | 0.322 | 0.107 |
| R8 | −13.134 | −0.038 | −0.000 | −0.643 | −0.002 |
| R9 | 0.038 | 0.101 | 0.265 | −0.197 | 0.180 |
| R10 | 6.062 | 0.292 | 0.014 | 0.055 | 0.003 |
| R11 | −0.000 | 0.001 | −0.160 | 0.161 | −0.164 |
| R12 | 0.729 | 0.435 | 0.259 | 0.010 | 0.161 |
| R13 | 5.904 | −1.124 | 0.214 | 0.327 | −0.103 |
| R14 | 3.876 | 0.990 | 0.253 | 0.446 | 0.178 |
| R15 | −24.559 | 0.625 | −0.016 | −0.113 | 0.003 |
| R16 | −1.059 | −0.508 | −0.244 | −0.341 | −0.280 |
| R17 | −0.379 | 0.179 | −0.084 | −0.171 | 0.120 |
| R18 | 18.675 | −0.915 | 0.045 | 0.493 | −0.024 |
| R19 | −0.060 | 0.110 | −0.202 | 0.126 | 0.139 |
| R20 | −2.667 | −1.196 | −0.536 | −0.407 | −0.423 |
| R21 | 0.033 | 0.052 | 0.083 | 0.052 | 0.216 |
| R22 | 14.571 | 0.107 | 0.001 | 0.350 | 0.003 |
| SUM | 4.052 | 0.459 | −0.012 | 0.129 | 0.263 |

In tables III, V and VII, the definitions of symbols are as follows:

S1 — Spherical aberration
S2 — Coma
S3 — Astigmatism
S5 — Distortion
P — Petzval sum FIGS. 1, 3 and 5 show indicia $d1$ through $d12$, $d1$ through $d9$ identifying the indicated dimensions and R1 through R22 identifying the indicated surfaces. The tables use these same indicia to identify the corresponding dimensions and surfaces in FIGS. 1, 3 and 5.

What is claimed is:

1. A super wide angle photographic objective lens having greatly improved aberrations, comprising a 10 group, 12 element lens wherein the lens elements have the following characteristics:

| Lens Surface | mm | Length in mm | Lens Number | d-line index of refraction | Abbe's Number |
|---|---|---|---|---|---|
| R1 | 519.231 | d1 11.06 | 1 | 1.64000 | 60.2 |
| R2 | 138.498 | l1 22.12 | | | |
| R3 | 209.135 | d2 37.50 | 2 | 1.51633 | 64.1 |
| R4 | −757.390 | l2 0.72 | | | |
| R5 | 78.365 | d3 8.99 | 3 | 1.64000 | 60.2 |
| R6 | 49.066 | l3 24.04 | | | |
| R7 | 117.788 | d4 8.99 | 4 | 1.64000 | 60.2 |
| R8 | 58.350 | l4 20.67 | | | |
| R9 | −384.615 | d5 31.25 | 5 | 1.63636 | 35.4 |
| R10 | −55.288 | d6 31.25 | 6 | 1.58913 | 61.2 |
| R11 | −619.439 | l5 14.42 | | | |
| R12 | 649.038 | d7 10.58 | 7 | 1.58913 | 61.2 |
| R13 | −106.296 | l6 0.48 | | | |
| R14 | 83.111 | d8 16.83 | 8 | 1.58913 | 61.2 |
| R15 | −73.077 | d9 7.69 | 9 | 1.81554 | 44.4 |
| R16 | 128.104 | l7 7.69 | | | |
| R17 | −192.308 | d7 7.21 | 10 | 1.51823 | 59.0 |
| R18 | −78.832 | l8 0.48 | | | |
| R19 | 403.846 | d11 6.73 | 11 | 1.76182 | 26.5 |
| R20 | 108.806 | l9 8.17 | | | |
| R21 | 743.971 | d12 16.83 | 12 | 1.51190 | 58.2 |
| R22 | −89.216 | | | | |

$F = 100$ mm $F1·2·3·4 = −0.919F$ $F1·2···6 = −1.F$ $F5·6 = 44.98F$ $f5 = 0.98F$ $f6 = −1.05F$ and wherein lenses 5 and 6 and lenses 8 and 9 form doublets;
the lenses are numbered 1 through 12 from the object side;
F is the resultant focal length of the whole lens system;
$F \cdot 1 \cdot 2 \cdots i$ is the resultant focal length of the first to the $i$-th lens;
$fn$ is the focal length of the $n$-th lens; and
R, d and l in numbered succession refer to the surface radii, thickness and spacing, respectively.

2. A super wide angle photographic objective lens having greatly improved aberrations, comprising a 10 group, 12 element lens wherein the lens elements have the following characteristics:

| Lens Surface | mm | Length in mm | | Lens Number | d-line index of refraction | Abbe's Number |
|---|---|---|---|---|---|---|
| R1 | 518.657 | d1 | 11.04 | 1 | 1.64000 | 60.2 |
| R2 | 138.308 | l1 | 22.09 | | | |
| R3 | 211.305 | d2 | 37.46 | 2 | 1.51633 | 64.1 |
| R4 | −726.730 | l2 | 0.72 | | | |
| R5 | 76.838 | d3 | 8.98 | 3 | 1.64000 | 60.2 |
| R6 | 48.384 | l3 | 24.01 | | | |
| R7 | 121.471 | d4 | 8.98 | 4 | 1.64000 | 60.2 |
| R8 | 59.271 | l4 | 20.65 | | | |
| R9 | −168.083 | d5 | 21.61 | 5 | 1.51633 | 64.1 |
| R10 | 74.331 | d6 | 31.21 | 6 | 1.60342 | 38.0 |
| R11 | −229.587 | l5 | 14.41 | | | |
| R12 | 696.345 | d7 | 10.56 | 7 | 1.58913 | 61.2 |
| R13 | −119.358 | l6 | 0.48 | | | |
| R14 | 83.019 | d8 | 16.81 | 8 | 1.58913 | 61.2 |
| R15 | −67.978 | d9 | 7.68 | 9 | 1.81554 | 44.4 |
| R16 | 132.229 | l7 | 7.68 | | | |
| R17 | −192.095 | d10 | 7.20 | 10 | 1.51823 | 59.0 |
| R18 | −77.808 | l8 | 0.48 | | | |
| R19 | 384.190 | d11 | 6.72 | 11 | 1.76182 | 26.5 |
| R20 | 105.595 | l9 | 8.16 | | | |
| R21 | 743.149 | d12 | 16.81 | 12 | 1.51633 | 64.1 |
| R22 | −88.028 | | | | | |

$F = 100$ mm.
$F1 \cdot 2 \cdot 3 \cdot 4 = -0.918F$
$F1 \cdot 2 \cdots 6 = -1.19F$
$F5 \cdot 6 = 10.11F$
$f5 = -0.97F$
$f6 = 0.97F$ and wherein
lenses 5 and 6 and lenses 8 and 9 form doublets;
the lenses are numbered 1 through 12 from the object side;
F is the resultant focal length of the whole lens system;
$F \cdot 1 \cdot 2 \cdots i$ is the resultant focal length of the first to the $i$-th lens;
$fn$ is the focal length of the $n$-th lens; and
R, d and l in numbered succession refer to the surface radii, thickness and spacing, respectively.

3. A super wide angle photographic objective lens having greatly improved aberrations, comprising a 10 group, 12 element lens wherein the lens elements have the following characteristics:

| Lens Surface | mm | Length in mm | | Lens Number | d-line index of refraction | Abbe's Number |
|---|---|---|---|---|---|---|
| R1 | 519.231 | d1 | 13.85 | 1 | 1.64000 | 60.2 |
| R2 | 130.205 | l1 | 40.86 | | | |
| R3 | 250.000 | d2 | 38.46 | 2 | 1.51633 | 64.1 |
| R4 | −569.697 | l2 | 0.24 | | | |
| R5 | 81.731 | d3 | 8.99 | 3 | 1.64000 | 60.2 |
| R6 | 51.734 | l3 | 24.04 | | | |
| R7 | 121.154 | d4 | 8.99 | 4 | 1.64000 | 60.2 |
| R8 | 60.657 | l4 | 23.08 | | | |
| R9 | −173.077 | d5 | 19.23 | 5 | 1.51633 | 64.1 |
| R10 | 80.288 | d6 | 33.65 | 6 | 1.62588 | 35.6 |
| R11 | −239.723 | l5 | 13.46 | | | |
| R12 | 3605.769 | d7 | 11.06 | 7 | 1.58913 | 61.2 |
| R13 | −113.405 | l6 | 0.24 | | | |
| R14 | 83.173 | d8 | 16.83 | 8 | 1.58913 | 61.2 |
| R15 | −69.711 | d9 | 8.65 | 9 | 1.81554 | 44.4 |
| R16 | 131.757 | l7 | 8.65 | | | |
| R17 | −199.519 | d10 | 9.61 | 10 | 1.51633 | 64.1 |
| R18 | −77.619 | l8 | 0.48 | | | |
| R19 | 353.365 | d11 | 6.73 | 11 | 1.80518 | 25.5 |
| R20 | 109.566 | l9 | 9.61 | | | |
| R21 | 649.038 | d12 | 19.23 | 12 | 1.51633 | 64.1 |
| R22 | −97.328 | | | | | |

$F = 100$ mm
$F 1 \cdot 2 \cdot 3 \cdot 4 = -0.9186F$
$F1 \cdot 2 \cdots 6 = -1.25F$
$F 5 \cdot 6 = 8.15F$
$f5 = -1.04F$
$f6 = 1.00F$ and wherein
lenses 5 and 6 and lenses 8 and 9 form doublets;
the lenses are numbered 1 through 12 from the object side;
F is the resultant focal length of the whole lens system;
$F \cdot 1 \cdot 2 \cdots i$ is the resultant focal length of the first to the $i$-th lens;
$fn$ is the focal length of the $n$-th lens; and
R, d and l in numbered succession refer to the surface radii, thickness and spacing, respectively.

* * * * *